Feb. 13, 1940.   E. W. KELLOGG   2,190,318
DAMPING SYSTEM
Filed April 21, 1938
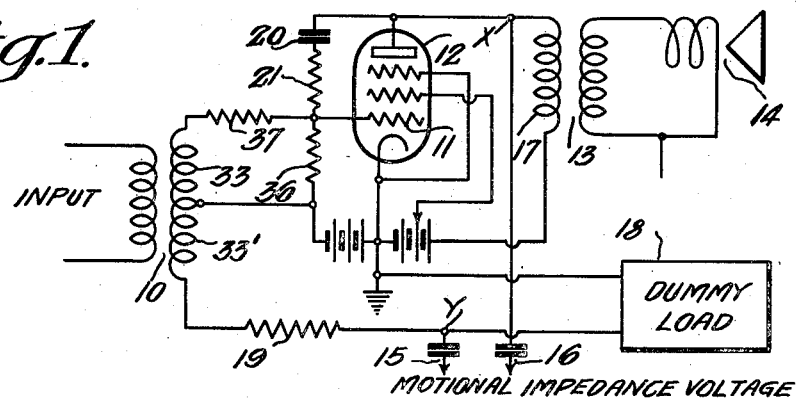
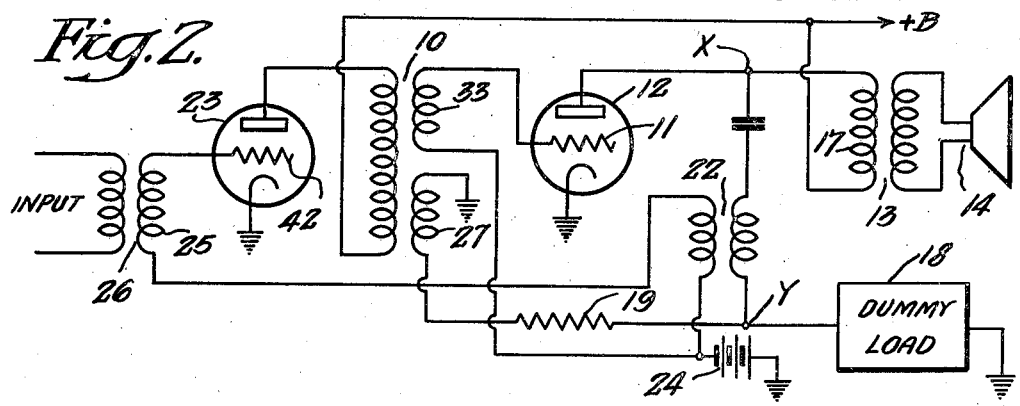
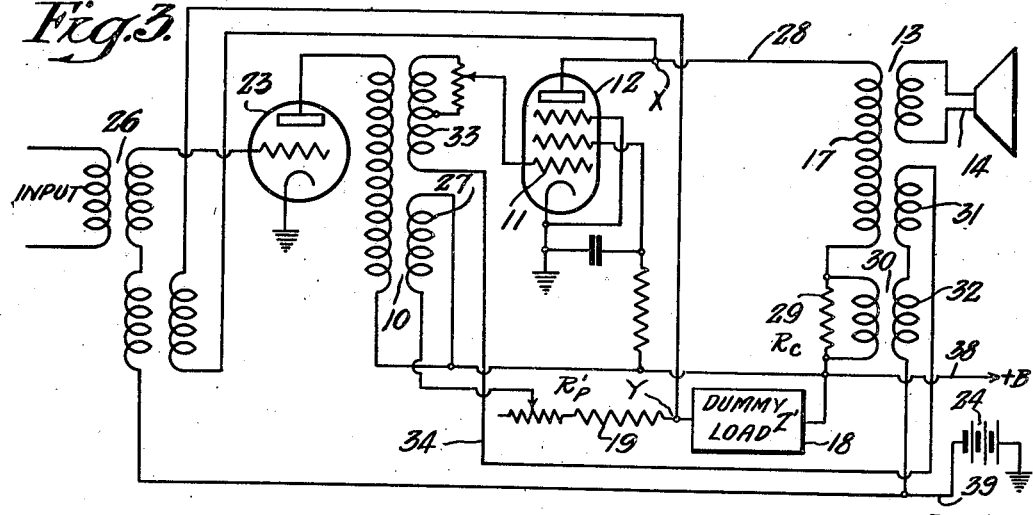
Inventor
Edward W. Kellogg
By
Attorney Patented Feb. 13, 1940

2,190,318

UNITED STATES PATENT OFFICE 2,190,318

DAMPING SYSTEM

Edward W. Kellogg, Moorestown, N. J., assignor to Radio Corporation of America, a corporation of Delaware Application April 21, 1938, Serial No. 203,224

14 Claims. (Cl. 179—180)

This invention relates to systems for damping the motion of vibratory bodies such as loud speaker diaphragms and phonograph record cutters, and has for its principal object the provision of an improved system and method of operation whereby a motional impedance potential dependent on the motion of the vibratory body may be utilized without the power losses heretofore involved to maintain the vibration of such a body within desired limits.

The present invention is related to that disclosed by my United States Patent 1,723,864 which involves the use of a bridge network including a pair of resistors for deriving a motional impedance potential which is fed back into the load circuit in such a way as to limit the motion of the load device. The present invention, in one of its principal applications, constitutes an improvement of one of the features of the aforesaid patent in that the impedance drop of an electron discharge device otherwise utilized to amplify the load current is utilized as one element of the network for deriving the motional impedance potential, which may be applied either to the input circuit of this device or to the input circuit of a preceding amplifier of the channel through which current is supplied to the load device. This arrangement has the advantage that the power otherwise lost in resistors or other impedance devices of the bridge is saved and more efficient operation of the system is produced.

The invention will be better understood from the following description considered in connection with the accompanying drawing and its scope is indicated by the appended claims.

Referring to the drawing

Figure 1 is a wiring diagram of one form of the invention applied to a loud speaker input circuit, Figure 2 is a wiring diagram of a damping system wherein the motional impedance potential is applied to the input circuit of an amplifier preceding the last stage of the channel, and Figure 3 is a wiring diagram of a modified damping system wherein the motional impedance potential is applied through somewhat different connections and is made independent of variation in the amplifier characteristics.

It is shown in my aforementioned Patent 1,723,864 that mechanical damping can be obtained by employing the voltage developed by the motion of an electromechanical or electroacoustic device to control current supplied to the input of said device. Providing suitable phase relations are preserved, almost any degree of damping can be obtained in this manner by simply controlling the amount of amplification employed between the motional voltage source and the load or utilization device.

The two general methods of obtaining motional voltage are (1) mounting an electromechanical voltage generator such as a moving coil in a magnetic field on the device which is to be damped and (2) providing a bridge circuit in which the impedance of the device is balanced against an impedance having as nearly as possible identical characteristics except for the absence of the motional voltage. The provision of an auxiliary voltage generator involves complications. On the other hand bridges are notoriously wasteful of power. In accordance with the invention, there is provided a bridge circuit employing the plate resistance of the output amplifier as one arm of the bridge. Since this resistance is present in any arangement wherein the device is operated by means of a thermionic tube, practically none of the possible undistorted output of the amplifier is wasted.

The damping system of Fig. 1 includes an input transformer 10 through which potential is applied to the control grid 11 of an amplifier 12 which has connected in its output circuit a transformer 13 through which audio frequency current is supplied to a loud speaker 14. In order to keep the loud speaker diaphragm from executing excessive vibrations when it is in mechanical resonance, it is desirable to impress upon an earlier stage of the amplifier which drives the loud speaker, a voltage proportional to the motional voltage developed in the moving coil of the loud speaker 14. However, since my present invention relates only to the method of obtaining such a motional voltage, I have not attempted in Fig. 1 to show the details of the circuit by which the motional voltage is applied to the amplifier.

It is well known that the voltage developed at the output terminals of a thermionic vacuum tube is the same as though a voltage $-\mu E_g$ were supplied through a resistance $R_p$, in which $E_g$ is the alternating voltage impressed on the grid, $\mu$ is the amplification factor of the tube and $R_p$ is the internal plate resistance of the tube. In my present invention the resistance $R_p$ is employed as one of the arms of a bridge, which I shall call the A arm. The second or B arm is the primary winding 17 of the transformer which supplies the loud speaker. It will be noted that the lower end of winding 17 is connected to a point of constant potential. Thus the voltage $-\mu E_g$ is impressed across the A and B arms in series. The same voltage must be impressed across the D and C arms which consist respectively of the resistance 19 and the dummy load 18 which is designed to have the same impedance as the winding 17 of the transformer which supplies the load speaker, except for that part of the impedance which results from the motion of the coil of the loud speaker 14. The voltage $-\mu E_g$ which is to be applied to the B and C arms of the bridge is not obtained from the voltage developed in the tube 12, but from an extra winding 13 on the input transformer 10, the turn ratio of the transformer 10 being adjusted to give this desired voltage.

In the foregoing I have assumed for the sake of simplifying the description of the operation of the circuit, that the impedances of the C and D arms are equal, respectively, to those of the A and B arms. It is well known that this is not necessary for the balance of an electrical bridge, but only that $C/A=D/B$. Thus the dummy load 18 might have ten times the impedance of the loud speaker transformer primary winding 17, and the C arm or resistance 19 likewise has a resistance equal to ten times the internal resistance of the amplifier tube 11. It is in general desirable for the sake of avoiding waste of power that the C and D arms should be of high impedance compared with the A and B arms. The desired motional impedance voltage appears between the points X and Y, and is available at the terminals 15 and 16, the blocking condensers shown in the connections being for the purpose of eliminating such constant or D. C. differences of potential as may exist.

Any motional voltage developed in the moving coil of the loud speaker 14, of course, appears across the transformer primary 17. The dummy load 18 may be a loudspeaker, similar to the loud speaker 14 having its coils blocked to prevent movement, or any other suitable device having substantially the same constants as the loud speaker 14 with its transformer, with the exception that it is rendered incapable of producing motional voltage.

In order to make the effective internal resistance of the tube constant, reverse feed back may be applied through means such as a capacitor 20 and a resistor 21, resistors 36 and 37 being provided to control, in conjunction with resistor 21, the ratio of voltage fed back to the input grid 11. These resistors in other words constitute a mixer network of a well known type. Since the mixing network 21, 36, 37 throws away some of the voltage developed in the winding 33 of transformer 10, this voltage loss must be taken into consideration in establishing the turn ratio between windings 33 and 33'.

In Fig. 2 the provision for feeding the motional voltage back into the input of the amplifier is shown. The motional impedance voltage appearing between the points X and Y is applied through a transformer 22 to the control grid 42 of a preceding amplifier 23, a C-battery 24 being included in the input circuits of both amplifier 11 and 22. Signal potential is applied to the grid 42 of the device 23 through the secondary winding 25 of an input transformer 26.

The device 12 may be the power stage of the amplifier while the device 23 is the driver stage. The load which is indicated as a transformer coupled loudspeaker has an impedance which may be represented by Z. If a voltage $E_g$, developed in winding 33, is applied to grid 11 of amplifier 12, the voltage with respect to ground at the point X is the same as though a voltage equal to $-\mu E_g$ were impressed across a resistance $R_p$ and Z in series, in which $R_p$ represents the internal plate resistance of the device 12 and $\mu$ the amplification constant. A second thermionic device with its grid supplied from the same source as the device 12 might be employed as the resistance arm as well as the voltage source for the other side of the bridge. The bridge network, however, is simplified if the two lower arms of the bridge consist of a fixed resistor 19 having a resistance $R_p'$ and a dummy load 18 having an impedance $Z'$. It is necessary to impress across these other arms a voltage equal to $-\mu E_g$. This voltage may be obtained from the tertiary winding 27 of the interstage transformer 10. If $$Z' = Z\frac{R_p'}{R_p},$$

Y will be at the same potential as X. In order to minimize the power requirements, the dummy load 18 is preferably of much higher impedance than the actual load impedance Z, but must vary in the same manner with frequency as the circuit of the loudspeaker 14 except for that portion of the loud speaker impedance which results from the motion of the loud speaker driving coil in its magnetic field. As indicated in connection with Fig. 1, it is possible to employ as the dummy load an identical loud speaker with the coil held stationary or with field excitation omitted and supplied through a transformer having a higher ratio of step-down than the output transformer 13. In practice a suitable resistance and coil circuit which has the required characteristics and is much smaller and less expensive may be employed. The resistance of the resistor 19 and the impedance of the dummy load 18 should be high enough to impose very little load on the transformer 10.

The voltage between the points X and Y, which results from bridge network unbalance, is impressed across the transformer 22, a secondary of which is connected in series with the input transformer 26 with such polarity that voltage generated in the load 14 causes current to flow in the direction of the induced voltage. This flow of current tends to resist the motion by which the voltage is induced and thereby provides damping of any mechanical or acoustical resonance in the load device or loud speaker 14.

In order that the bridge may remain balanced, it is important that the tube resistance be constant and subject to little if any change if the output tube 12 is replaced. The employment of degenerative feed back makes it possible to maintain the effective output resistance of the amplifier 12 substantially independent of the tube employed. It is well known that by the employment of negative feedback a thermionic device of inherently high plate resistance, such as a pentode, can be made to show an effective output resistance of much lower value. This output resistance will, however, depend on the mutual conductance $G_m$ of the device. No provision for negative feedback is shown in Fig. 2, but Fig. 3 shows a circuit employing such feedback. It is possible by feeding back a voltage proportional to the output current to cause a device having inherently low plate resistance to show a much higher plate resistance. Conversely feeding back a voltage proportional to the output voltage has the effect of lowering the effective output impedance of an amplifier device. If either of these expedients is applied alone, the amount of feedback employed is limited by the value of resistance desired and the conditions which make an amplifier with feedback largely independent of tube characteristics can not be obtained because this requires employing a high degree of feedback. It is possible, however, by feeding back voltages proportional to both output voltage and output current to carry the feedback as far as necessary to make both the amplification and the output resistance substantially independent of the device employed. In this case the output impedance will depend on the relative amounts of feedback of the voltages proportional to output voltage and output current, respectively.

A circuit susceptible of producing stabilization in the manner just described is illustrated by Fig. 3. In this circuit the plate supply bus 38 is to be considered as a constant potential point. In series with the load is provided a resistor 29 having a resistance $R_c$ across which a voltage proportional to the output current is developed. This voltage is applied through transformer 30 to the input circuit of the power stage amplifier 12. The impedance of the primary winding of transformer 30 must be high compared with $R_c$ so that the impedance of the two in multiple will be practically a pure resistance. Assuming the resistance $R_c$ of the resistor 29 to be small enough in comparison with the impedance Z of the load circuit to be neglected, a voltage proportional to the tube output voltage may be obtained from a tertiary winding 31 of the output transformer 13. A special transformer, however, might be employed. Even if the resistance $R_c$ of the resistor 29 is appreciable in comparison with the impedance Z of the loud speaker circuit, this only slightly alters the effective amplifier output resistance but does not prevent the feedback circuit from accomplishing its purpose of substantially eliminating the variable factors.

The secondary winding 32 of the transformer 30, a tertiary winding 31 of the transformer 13, and the control grid input winding 33 of the transformer 10 are connected in series through the lead 34 between the bias bus 39 and the control grid 11, so that the voltages add. The polarities of the transformers must be such as to give degenerative rather than regenerative feed back. The output amplifier 12 in this instance is shown as a pentode which has an inherently high plate resistance. For such a device, the output current may be considered as substantially equal to $G_m$ times the voltage impressed on its control grid 11, in which $G_m$ stands for the mutual conductance or transconductance of the tube. Under these conditions the control of output impedance is simpler than in the case of a tube having plate resistance of the same order of magnitude as the impedance Z of the load circuit as presented in the primary winding of the transformer 13. Although the stabilizing feedback voltages are shown as applied to the grid of the output amplifier 12, the negative feedback might be carried back several stages if desired depending on how closely it is found necessary to make the output resistance independent of the amplifier tubes. When feedback is carried through several stages, certain well established precautions must be observed to insure stability and freedom from oscillations. No attempt is made here to show such refinements, it being assumed that anyone familiar with the principles of feedback in amplifiers can meet the requirements.

For the purpose of showing the various relationships involved, let $r$ represent the input volts per ampere of output current as determined by the resistance $R_c$ of the resistor 29 and the ratio of the transformer 30, let $G_m$ represent the mutual conductance of the output amplifier 12 or of this amplifier and such preceding stages as may be included in the feedback circuit, let $b$ stand for the ratio of the voltage feedback, let $E_0$ equal the input voltage as developed in the secondary winding 33 of the interstage transformer 10, and let $E_2$ equal the output voltage and $I_2$ output current. Assuming that the device 12 is of the pentode type or that its plate impedance $R_p$ is so high in comparison with the impedance Z of the loud speaker circuit that $I_2$ is substantially equal to $G_m E_1$. The voltage actually applied to the grid is $$E_1 = E_0 - rI_2 - bE_2$$

Substituting $G_m E_1$ for $I_2$ and $G_m Z E_1$ for $E_2$, since $E_2 = ZI_2$, $$E_1 = E_0 - rG_m E_1 - bG_m Z E_1$$

$$E_1(1 + rG_m + bG_m Z) = E_0$$

$$E_1 = \frac{E_0}{1 + rG_m + bG_m Z}$$

$$I_2 = \frac{G_m E_0}{1 + rG_m + bG_m Z}$$

If either $rG_m$ or $bZG_m$ is large compared with unity, the approximation may be used $$I_2 = \frac{G_m E_0}{rG_m + bZG_m} = \frac{E_0}{r + bZ}$$

or since $E_2 = ZI_2$ $$E_2 = \frac{E_0 Z}{r + bZ}$$

which may be written $$E_2 = \left(E_0 \frac{1}{b}\right) \frac{Z}{\frac{r}{b} + Z}$$

This is identical with the expression for the voltage across an impedance Z, if a voltage $$E_0 \frac{1}{b}$$

is impressed across the impedance Z and a resistance $$\frac{r}{b}$$

in series. Thus the voltage across the load depends upon the constants $r$ and $b$ but not on any tube factors.

By way of illustration of the application of feedback for making output impedance substantially independent of the tube, I may assume that the output amplifier 12 has a mutual conductance $G_m = .002$, and an actual resistance $R_p = 1,000,000$ ohms, that $Z = 10,000$ ohms, and that it is desired to make the effective output impedance equal to 10,000 ohms. If $R_c$ is 250 ohms and transformer 30 has a step-up ratio of 20, the current feedback factor is $r = 20$ times 250 or 5000 grid volts per ampere of output current. If winding 31 of output transformer 13 has half as many turns as the primary, the voltage feedback ratio is $b = .5$. This makes the output resistance $$\frac{r}{b} = 10,000$$

as called for. The factors $rG_m$ and $bZG_m$ for the case assumed each have a value of 10, or in other words are large in comparison with unity.

If we use the more exact formula for $E_2$; namely, $$E_2 = \frac{G_m Z E_o}{1 + rG_m + bGZ}$$

we find that a 20% change in $G_m$; namely from .002 to .0024 results in only .6% change in $E_2$, or from .954$E_o$ to .96E. Thus the requirement of holding the amplification within closer limits than would be possible with an ordinary amplifier has been secured. If a still closer value of amplification must be maintained, it might be desirable to make the feedback include an extra stage. The more exact formula shows that for the case assumed, the transformer 10 should not have exactly twice as many turns in winding 27 as in the winding 33 but approximately 1.95 times as many. In practice it would be necessary to make several factors adjustable. For example, a small adjustment should be provided in $R_p'$ (or perhaps as an alternative in $R_c$) and a potentiometer might be provided across winding 33 of transformer 10 to bring the amplification to exactly the right value for balance.

It will be noted that the input circuit 11—33 is of practically infinite impedance. Therefore, the voltages $rI_2$, $bE_2$ do not cause any current to flow through winding 33 of transformer 10 and do not affect the voltage developed in the tertiary winding of transformer 10. On the other hand, this voltage bears a fixed ratio to the voltage $E_o$ induced in winding 33 from the primary or input winding. In order for the bridge to be in balance, the ratio of turns in winding 27 to winding 33 must be equal to $$\frac{1}{b}$$

with perhaps a slight correction as already explained. In this it is assumed that $R_p'$ and $Z'$ are of sufficiently high impedance to impose practically no load on winding 27.

It will not ordinarily be necessary to hold within close limits the amplification of the bridge unbalance (or voltage between X and Y) which causes the damping current to flow in the load circuit Z. I have therefore not shown any feedback principles applied for the purpose of holding the amplification of the tube 12 to a specified value. It is, of course, essential whenever feedback is employed through transformers to make sure that the transformers are capable of handling a wide frequency range. There are also well known methods of employing resistance capacity couplings instead of transformers for feeding back voltages. A familiar example is the employment of a cathode resistor without condenser bypass, to provide a feedback proportional to current. I find, however, that applying this to the output stage would waste too much power and therefore sacrifice some of the benefits of my invention.

I claim as my invention:

1. In a system for damping the motion of a device including a load circuit and a member movable in response to the current of said circuit and susceptible of producing therein a motional impedance voltage, the combination of an amplifier provided with an input circuit and with output electrodes connected to said load circuit, a network including the output electrode impedance of said amplifier and balanced with respect to said load, and means for deriving said motional impedance voltage from said network, said last named means including a load device and a resistor providing relatively high impedance adjacent arms of a bridge circuit in said network and an output connection between said arms and a point on said network between the output electrode and said load circuit.

2. In a system for damping the motion of a device including a load circuit and a member movable in response to the current of said circuit and susceptible of producing therein a motional impedance voltage, the combination of an amplifier provided with an input circuit and with output electrodes connected to said load circuit, a network including the output electrode impedance of said amplifier and balanced with respect to said load current, means for deriving said motional impedance voltage from said network, said last named means including a load circuit connected with said output electrodes providing with said output electrode impedance two adjacent arms of a bridge circuit in said network, a load device and a resistor providing two adjacent relatively high impedance arms of said bridge circuit and an output voltage connection between said last named arms and a point on said network between said first named arms, and means for subjecting said input to said motional impedance voltage.

3. In a system for damping the motion of a device including a load circuit and a member movable in response to the current of said circuit and susceptible of producing therein a motional impedance voltage, the combination of an amplifier provided with an input circuit and with an output circuit connected to said load circuit, a network including the output stage of said amplifier and balanced with respect to said load current, means for deriving said motional impedance voltage from said network, said last named means including the cathode-anode impedance of the amplifier output stage, said load circuit, a dummy load circuit and a resistor providing two voltage points having a voltage output which is dependent on the motion of said member, and a degenerative feedback circuit connected between said input and output circuits for rendering said network independent of variations in the characteristics of said amplifier.

4. In a system for damping the motion of a device including a load circuit and a member movable in response to the current in said load circuit and susceptible of producing therein a motional impedance voltage, the combination of an amplifier provided with an input circuit and with an output circuit connected to said load circuit, a network provided with one arm consisting of the cathode-anode electronic path of said amplifier, with another arm consisting of said load circuit and with means for causing said network to be balanced with respect to said load current, said last named means including a dummy load device and a resistor providing adjacent relatively high impedance arms of a bridge circuit in said network, and means for deriving said motional impedance voltage from said network, said last named means including a potential output circuit connected between said load circuit and the anode of said amplifier and between said last named arms of the network.

5. In a system for damping the motion of a device including a load circuit and a member movable in response to the current of said circuit and susceptible of producing therein a motional impedance voltage, the combination of an amplifier provided with an input circuit and with an output circuit connected to said load circuit, means for applying signal impulses to said input circuit, a four-armed network including a first arm consisting of the cathode-anode path of said amplifier, a second arm consisting of said load circuit, a third arm consisting of a dummy circuit comparable to said load circuit with the exception of said motional impedance voltage and a fourth arm including a device of an impedance comparable to that of said cathode-anode path, means for applying to said third and fourth arms signal impulses which are reversed with respect to the signal impulses applied to said input circuit, and means for deriving said motional impedance voltage from points intermediate said cathode-anode path and said load circuit and intermediate said dummy load circuit and said device.

6. In a system for damping the motion of a device including a load circuit and a member movable in response to the current of said circuit and susceptible of producing therein a motional impedance voltage, the combination of an amplifier provided with an input circuit and with an output circuit connected to said load circuit, means for applying signal impulses to said input circuit, a four-armed network including a first arm consisting of the cathode-anode path of said amplifier, a second arm consisting of said load circuit, a third arm consisting of a dummy circuit comparable to said load circuit with the exception of said motional impedance voltage and a fourth arm including a device of an impedance comparable to that of said cathode-anode path, means for applying to said third and fourth arms signal impulses which are reversed with respect to the signal impulses applied to said input circuit, means for deriving said motional impedance voltage from points intermediate said cathode-anode path and said load circuit and intermediate said dummy load circuit and said device, and means for applying said motional impedance voltage to said input circuit.

7. In a system for deriving a voltage dependent on variations in the impedance of an electrical device, the combination of an amplifier provided with an input circuit and with an output circuit connected to said electric device, means for applying signal impulses to said input circuit, a four-armed network including a first arm consisting of the cathode-anode path of said amplifier, a second arm consisting of said electrical device, a third arm consisting of a dummy circuit having an impedance which is to be compared with that of said electrical device, and a fourth arm including a resistance comparable to that of said cathode-anode path, means for applying to said third and fourth arms signal impulses which are reversed with respect to the signal impulses applied to said input circuit, means for deriving voltage from points intermediate said cathode-anode path and said electrical device and intermediate said dummy load circuit and said fourth arm, and means for applying to said input a degenerative potential dependent on the voltage or current of said load circuit.

8. In a system for damping the motion of a device including a load circuit and a member movable in response to the current of said circuit and susceptible of producing therein a motional impedance voltage, the combination of an amplifier provided with an input circuit and with an output circuit connected to said load circuit, a network including said output circuit, a load circuit coupled thereto, a dummy load device and a circuit impedance element serially connected to provide a bridge circuit balanced with respect to said load current, means for deriving said motional impedance voltage from said network, and a degenerative feedback circuit for applying to said input circuit a potential dependent on the voltage and current of said load circuit.

9. In an apparatus for deriving a voltage proportional to the variations in the impedance of a load device, the combination of a thermionic amplifier through which current is supplied to said device, a bridge network, one arm of which is constituted by the internal resistance of said amplifier, whereby said amplifier functions as a voltage deriving device in said network and for signal amplification, means for completing said network comprising a dummy load device, a high impedance circuit element and a load circuit disposed serially in connection with the internal resistance of said amplifier, and a voltage output connection between said amplifier and the load circuit and between the dummy load device and said high impedance circuit element.

10. In an apparatus for deriving a voltage proportional to the variations in the impedance of a load device, the combination of a thermionic amplifier through which current is supplied to said device, a bridge network, one arm of which is constituted by the internal resistance of said amplifier, a degenerative feedback connection between the input and output circuits of said amplifier whereby the output resistance of said amplifier is stabilized, means providing a circuit coupled to the amplifier input circuit and including a series high impedance circuit element and a dummy load device, and means providing a voltage output circuit between the amplifier output circuit and said last named circuit for deriving said voltage.

11. The combination with an electric signal amplifier comprising an amplifier tube and a signal output device coupled therewith and including a member movable in response to output current from said amplifier, of means for damping the motion of said member including a balanced bridge circuit comprising the anode-cathode impedance of said amplifier, the load impedance in the output circuit of said amplifier, a balancing load device and a high resistance arm for completing said bridge circuit, a feedback circuit for said amplifier output stage coupled to the amplifier output circuit, and means for subjecting the signal circuit preceding said output stage to currents derived from said bridge crcuit between the output circuit and a point between said balancing load device and said high resistance arm.

12. In a system for damping the motion of a device including a load circuit and a member movable in response to the current of said circuit and susceptible of producing therein a motional impedance voltage, the combination of an amplifier provided with an input circuit and with output electrodes connected to said load circuit, a network including the output electrode impedance of said amplifier and balanced with respect to said load, means for deriving said motional impedance voltage from said network, means providing degenerative feedback in said amplifier proportional to the output current therefrom, and additional means providing degenerative feedback in said amplifier proportional to the output voltage therefrom.

13. The combination with an electric signal amplifier comprising an amplifier tube and a signal output device coupled therewith and including a member movable in response to output current from said amplifier, of means for damping the motion of said member including a balanced bridge circuit comprising the anode-cathode impedance of said amplifier, the load impedance in the output circuit of said amplifier, a balancing load device and a high resistance arm for completing said bridge circuit, current and voltage feedback circuits for said amplifier output stage coupled to the amplifier output circuit, and means for subjecting the signal circuit preceding said output stage to currents derived from said bridge circuit between the output circuit and a point between said balancing load device and said high resistance arm.

14. The combination with an electric signal amplifier comprising an amplifier tube and a signal output device coupled therewith and including a member movable in response to output current from said amplifier, of means for damping the motion of said member including a balanced bridge circuit comprising the anode-cathode impedance of said amplifier, the load impedance in the output circuit of said amplifier, a balancing load device and a high resistance arm for completing said bridge circuit, means providing degenerative feedback in said amplifier proportional to the output current therefrom, additional means providing degenerative feedback in said amplifier proportional to the output voltage therefrom, and means for subjecting the signal circuit preceding said output stage to currents derived from said bridge circuit between the output circuit and a point between said balancing load device and said high resistance arm.

EDWARD W. KELLOGG.